United States Patent [19]
Evan

[11] Patent Number: 5,371,736
[45] Date of Patent: Dec. 6, 1994

[54] UNIVERSAL PROTOCOL PROGRAMMABLE COMMUNICATIONS INTERFACE

[75] Inventor: Shabtai Evan, Saratoga, Calif.

[73] Assignee: ABB Power T&D Company, Inc., Blue Bell, Pa.

[21] Appl. No.: 993,702

[22] Filed: Dec. 21, 1992

[51] Int. Cl.$^5$ ............................................. H04J 3/14
[52] U.S. Cl. ...................................... 370/79; 370/82; 370/83; 370/85.1; 340/825.06
[58] Field of Search ................. 370/79, 83, 84, 85.1, 370/82; 340/825.06

[56] References Cited

U.S. PATENT DOCUMENTS

| | | | |
|---|---|---|---|
| 3,972,031 | 7/1976 | Riemenschneider et al. | 340/173 R |
| 4,368,512 | 1/1983 | Kyu et al. | 364/200 |
| 4,395,764 | 7/1983 | Matsue | 365/78 |
| 4,631,666 | 12/1986 | Harris et al. | 395/325 |
| 4,907,225 | 5/1990 | Gulick et al. | 370/94.1 |
| 4,945,473 | 7/1990 | Holtey et al. | 364/200 |

Primary Examiner—Douglas W. Olms
Assistant Examiner—Russell W. Blum
Attorney, Agent, or Firm—Woodcock Washburn Kurtz Mackiewicz & Norris

[57] ABSTRACT

A general purpose programmable communications interface designed to support a wide variety of serial synchronous and asynchronous communication protocols. A universal protocol communications (UPC) interface is designed to operate on a VME bus in conjunction with a CPU board which contains the application software that utilizes the communications capabilities of the UPC interface. Per channel DMA is available on input/output lines of the interface together with bit level control for message processing so that a variety of bit oriented communications protocols may be supported by simple reconfiguration of the receiver/transmitter of the programmable UPC interface. In a preferred embodiment, a dynamically variable bit length shift register is used to organize the received and transmitted data into serial packets of the appropriate size on a per channel basis independent of the actual width of the shift register. Reconfiguration for different protocols is accomplished by simply changing a bit count value stored in a bit counter which counts the number of serial data bits received or transmitted in each data word by the dynamically variable bit length shift registers of the transmit and receive circuitry.

12 Claims, 5 Drawing Sheets

UPC BOARD

USART 124 OR 126

RECEIVE CONTROL
STATE MACHINE 204

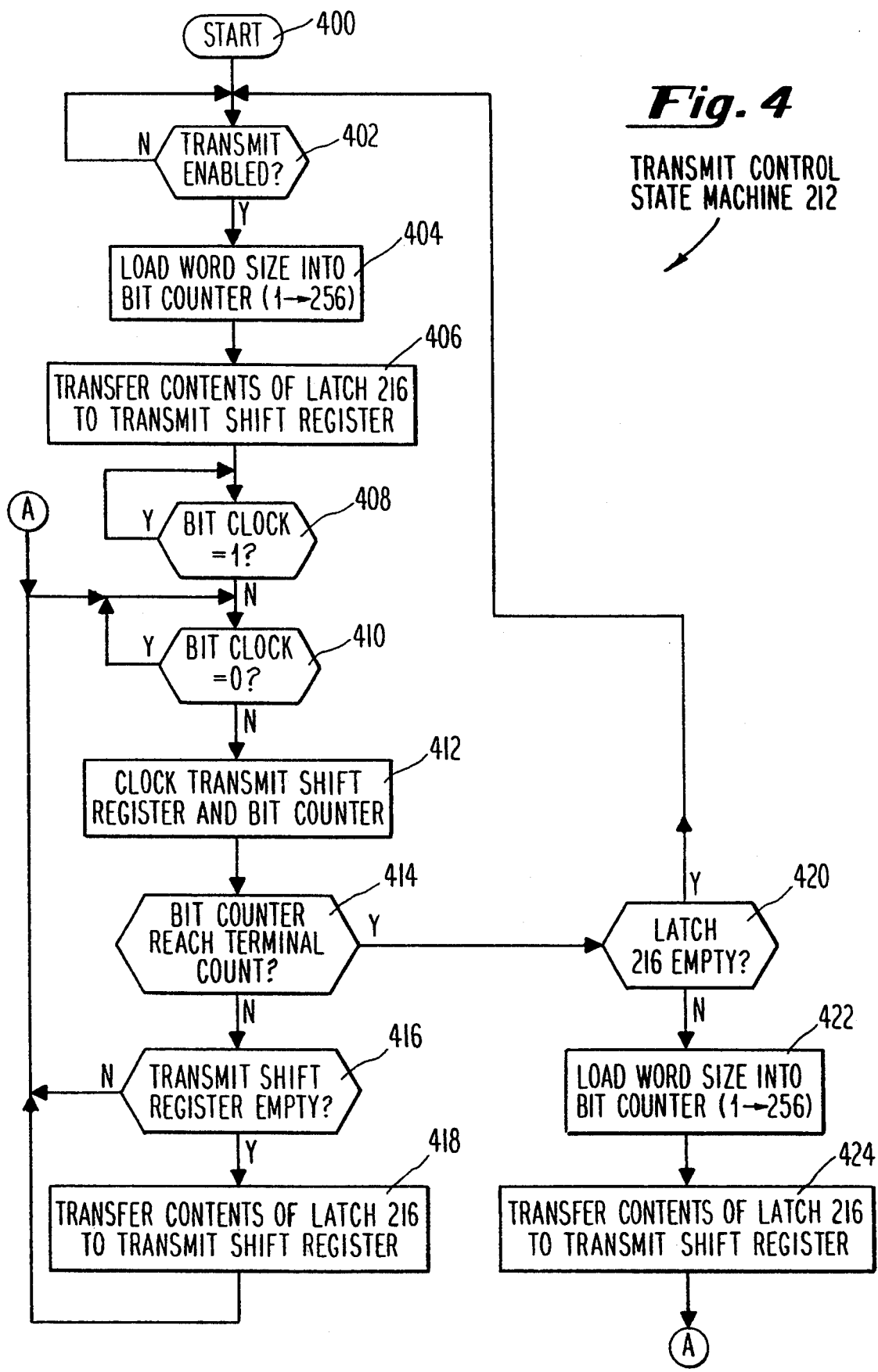

UNIVERSAL PROTOCOL PROGRAMMABLE COMMUNICATIONS INTERFACE

BACKGROUND OF THE INVENTION

1. Field of the Invention

The present invention relates to a programmable communications interface for general purpose communications in any of a wide variety of serial synchronous and asynchronous communication protocols. More particularly, the present invention relates to a communications interface with per channel DMA input/output in conjunction with bit level control whereby the interface is reconfigurable to support a variety of bit oriented communication protocols transmitted over a communications line.

2. Description of the Prior Art

Data protocol controllers are widely used to allow data communications between communications devices over one or a plurality of communications channels. Such data communications may be synchronous or asynchronous, and accordingly, prior art data protocol controllers typically comprise industry standard universal asynchronous receivers/transmitters (UARTs) or universal synchronous/asynchronous receivers/transmitters (USARTs). Generally, UARTS and USARTS operate in accordance with a particular bit-oriented protocol which is standardized for both the receiver and the transmitter connected to the data channel.

For example, Gulick et al. describe in U.S. Pat. No. 4,907,225 a data protocol controller comprising a UART which supports bit-oriented protocols such as those used in integrated services digital networks (ISDN). The data protocol controller therein described has a bit-oriented protocol and is attached to a computer terminal and the like to allow protocol conversion/rate adaptation to the communications channel. The data protocol controller of Gulick et al. comprises a commercially available UART connected to a microprocessor interface, an internal bus, and a full-duplex device. The UART also includes a transmitter for parallel reception of data on the internal bus. The UART has an eight bit shift register for parallel to serial conversion of the input data which is provided to the full-duplex device as a stream of serial data. The UART further comprises a receiver for serial reception of data on the full-duplex device. The receiver has another eight bit shift register for serial to parallel conversion of the input data which is provided to the internal bus of the protocol controller. The UART thus described by Gulick et al. is compatible with the 8250 standard and can be selectively operated in synchronous or asynchronous modes. Unfortunately, however, the UART described by Gulick et al. is limited by fixed width transmit and receive FIFOs which store only ten-bit words and provide no mechanism for storing data having bit lengths other than 8-bits (plus a 1-bit parity error flag and a 1-bit special character flag). Hence, the UART described by Gulick et al. is not readily configurable to transmit/receive data in data protocols having different bit lengths. As a result, all communications devices communicating through the data protocol controller of Gulick et al. must have the same number of bits in transmitted/received data words in order to permit proper functioning of the data protocol controller.

A communications controller interface described by Holtey et al. in U.S. Pat. No. 4,945,473 provides a technique for emulating an interface between a microprocessor control unit and a multi-line communications unit using dedicated memory for each communications line. However, the communications controller interface of Holtey et al. is similarly limited to communications in accordance with a predetermined protocol. An improved UART is desired which may be reconfigured to allow communication to/from communication devices having different formats and different bit lengths in the communicated data words.

The data protocol limitations of prior art data protocol controllers are particularly troublesome in the SCADA (supervisory control and data acquisition) industry where numerous monitoring devices in the field must communicate over communications lines with a central control computer. Since the monitoring devices are typically replaced at different points in time and thus cannot be assured to have the same protocols as other monitoring devices currently on-line, it is desirable that the communications interface to the central control computer be able to recognize data words of different formats and bit lengths to facilitate system design. Such a function would permit extended use of existing SCADA equipment by allowing communication between older monitoring devices and central control computers and newer monitoring devices and the like independent of the protocol of the newer devices. However, to the inventor's knowledge, such a universal protocol communications interface has heretofore been unavailable in the art.

Accordingly, a universal protocol communications interface is desired which can be easily reconfigured or reprogrammed to handle communications among communications devices operating under a variety of different bit oriented communication protocols. The present invention has been designed to meet these needs.

SUMMARY OF THE INVENTION

The present inventor has met the above-mentioned needs in the prior art by designing a universal protocol communications (UPC) interface which is programmable so as to function as a general purpose communications interface for supporting a wide variety of serial synchronous and asynchronous communications protocols. In a preferred embodiment, the UPC interface of the invention operates on a VME bus in conjunction with a CPU board which contains the application software that will utilize the communications capabilities of the UPC interface of the invention. Alternatively, the UPC interface of the invention may operate in conjunction with an emulation of a VME computer backplane. Features such as per channel DMA input/output together with bit level control of message processing result in a very flexible and efficient input/output UPC interface in accordance with the invention for applications which must support a variety of bit oriented communications protocols.

Generally, the functions of the UPC interface of the invention are implemented using a combination of discrete logic components and programmable gate array components which are programmed with the logic equations necessary to perform the UPC interface functions. However, the UPC interface of the invention is particularly characterized by a USART having a programmable word bit length which may be programmed independently for each communications channel so as to provide separate protocol support on a per channel basis for synchronous and asynchronous communication over each data communications channel via an RS-232, RS-422 or other line interface standards for word bit lengths varying from 1 to 256 bits and data transmission rates between 300 and 19.2 baud. As will be appreciated by those skilled in the art, although the words have bit lengths which vary in accordance with the invention from 1 to 256 bits, the serial data is transmitted via the line interface in data packets having bit lengths dictated by the line interface standard (e.g., 8 bits for an RS-232).

A preferred embodiment of a universal protocol communications interface in accordance with the invention is controlled by a host processor to permit serial synchronous and asynchronous data communications over a plurality of data communications channels with data communications devices having the same or different bit oriented data communications protocol as the host processor. Such a circuit in accordance with the invention preferably comprises a host interface for selectively providing read and write access to the host processor and a data communications controller. Preferably, the data communications controller comprises a data buffer connected to the host processor via the host interface, a memory for storing data for passage to/from the data communications devices, a DMA device for providing addresses to data stored in the memory, a data bus for providing data communication among the buffer, the memory and the DMA device, a controller for arbitrating among different requests for access to the data bus, and at least one programmable synchronous/asynchronous receiver/transmitter (USART) connected to the data bus so as to provide data communications between the data bus and a plurality of data communications devices over the plurality of data communications channels. Preferably, each programmable USART has a programmable word bit length which may be programmed independently for each of the plurality of data communications channels so as to provide serial data communication over each data communications channel in the word bit length of the data communications device connected thereto.

In a preferred configuration, a plurality of the data communications controllers are provided for full duplex input/output channels wherein each data communications controller comprises one of the programmable USARTs for each of the data communications channels. Also, each programmable USART preferably comprises a receiving dynamically variable bit length shift register for shifting onto the data bus from a data communications channel serial input data having a known data word bit length and a transmitting dynamically variable bit length shift register for shifting from the data bus into the data communications channel serial output data having the known word bit length. Each programmable USART is further characterized by a receive bit counter which stores the known word bit length and counts bits of the serial input data inputted into the receiving dynamically variable bit length shift register and by a transmit bit counter which stores the known word bit length and counts bits of the serial output data output from the transmitting dynamically variable bit length shift register. Preferably, each programmable USART further comprises a receive controller for controlling the receiving dynamically variable bit length shift register to shift onto the data bus the serial input data in words having the known word bit length for storage in the memory, and a transmit controller for controlling the transmitting dynamically variable bit length shift register to shift into the data communications channel the serial output data in words having the known word bit length. In particular embodiments, the receiving dynamically variable bit length shift register of the USART of the invention has a physical bit length which does not equal the known word bit length and accordingly shifts least significant bits of the serial input data to the least significant bits of the receiving dynamically variable bit length shift register prior to shifting the serial input data onto the data bus.

In the illustrated embodiment, the host interface of the invention is connected to a VME computer backplane via a VME bus and further includes a controller for controlling the direction of data flow between the VME bus and the data bus through the host interface and for providing system interrupts to the host interface and the data communications controller in response to interrupt requests from the host processor.

The scope of the invention also includes a method of transmitting serial synchronous and asynchronous data from a host computer over a plurality of data communications channels to one or more data communications devices having the same or different bit oriented data communications protocol as the host computer, comprising the steps of:

for each data communications channel, loading a word bit length of the data communications device to which that channel is connected;
setting a desired data rate;
starting at a user defined address, loading a memory of the host computer with data to be transmitted as output data to the data communications device;
loading a DMA device with the user defined address and the number of words of data which are to be read from the memory starting at the user defined address;
enabling data transmission;
transferring words of data having a word bit length of the memory to a dynamically variable bit length shift register starting at the user defined address;
shifting data from the dynamically variable bit length shift register into the data communications channel until a number of bits equal to the word bit length has been transferred; and
once the number of bits equal to the word bit length have been shifted into the communications channel, reloading the dynamically variable bit length shift register with further words of data from the memory.

The scope of the invention further includes a method of receiving serial synchronous and asynchronous data at a host computer via a plurality of data communications channels, each data communications channel being connected to a data communications device having the same or different bit oriented data communications protocol as the host computer, comprising the steps of:

for each data communications channel, loading a word bit length of the data communications device to which that channel is connected;
setting a desired data rate;
determining an address of a memory of the host computer to which input data from the data communications device is to be stored;
loading a DMA device with the memory address and the number of words of input data from the data communications device which are to be written into the memory starting at the memory address;

enabling data receipt;

transferring words of input data having the word bit length of the data communications device to a dynamically variable bit length shift register;

shifting data from the dynamically variable bit length shift register into the memory until a number of bits equal to the word bit length has been stored in the memory; and once the dynamically variable bit length shift register has shifted the number of bits equal to the word bit length to the memory, loading the dynamically variable bit length shift register with further words of data having the word bit length from the data communications device.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings, of which:

FIG. 4 illustrates a flow diagram of a transmit control state machine of the USART illustrated in FIG. 2.

DETAILED DESCRIPTION OF THE PREFERRED EMBODIMENTS

The inventor of the subject matter disclosed and claimed herein has met the above-mentioned needs in the art by developing a programmable UPC interface which is easily reconfigurable by resizing the transmit and receive shift registers to accept any of a variety of communications protocols used by the communications devices connected to the input/output communications lines of the UPC interface. Although the present invention will be described with respect to a preferred embodiment of a UPC interface which interfaces to a supervisory computer for a supervisory control and data acquisition (SCADA) system, those skilled in the art will appreciate that the description given herein is for exemplary purposes only and is not intended in any way to limit the scope of the invention. In other words, the programmable receive and transmit shift registers of the invention may be used in interfaces to a variety of other communications devices which support a variety of bit-oriented protocols as described herein. All questions regarding the scope of the invention should be resolved by referring to the appended claims.

In a preferred embodiment of the invention, the UPC interface described herein is embodied in a single UPC Board and is connected via a VME bus to a VME computer processor board (backplane). The UPC interface of the invention typically provides an interface between the VME computer backplane and the communications channels to any of a plurality of remote data collection units (RTUs) at remote data collection sites. In the implementation illustrated in FIG. 1, eight transmit/receive lines with control lines are provided on each UPC Board, where each transmit/receive line communicates via a standard RS-232 line interface to the RTUs. Typically, the RTUs monitor some open or closed loop process to provide control data to the supervisory control (host) computer via the UPC interface of the invention.

As noted above, previous SCADA systems have been limited in that the supervisory control computer and RTUs have had to communicate over the communications lines via a single predetermined bit-oriented protocol. Such an arrangement has proven to be unacceptable because as the RTUs are updated and replaced there is no guarantee that the replacement RTUs will have the same data protocols as the RTUs which they are replacing. The UPC interface of the invention has thus been designed to support a plurality of bit-oriented protocols by providing a plurality of independently programmable, highly configurable input/output channels on each UPC Board. In other words, the UPC interface of the invention may be configured to transmit/receive a data packet of any size between 1 and 256 bits for the transfer of data to/from the RTUs.

Figure 1:
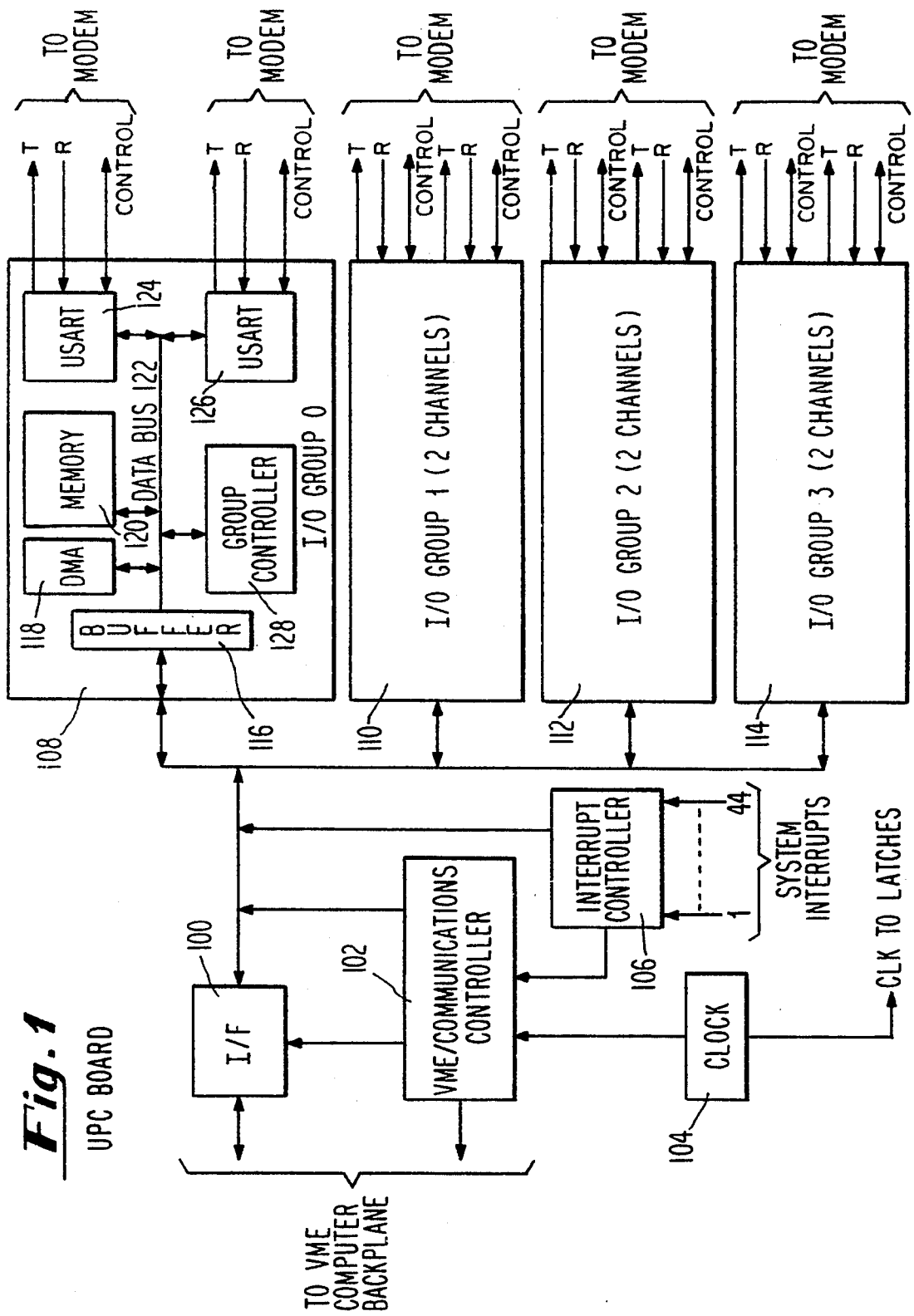
FIG. 1 illustrates a preferred embodiment of a UPC interface in accordance with the invention.

FIG. 1 illustrates a preferred embodiment of a UPC Board including a UPC interface in accordance with the invention. As illustrated, a common VME bus interface 100 interfaces an internal bus of the UPC Board to a VME bus connected to the VME computer backplane of the supervisory control (host) computer. The host computer typically has a bit protocol which is known to the system programmer and has previously been used for all communications to/from the RTUs. However, in accordance with the present invention, the UPC interface of the invention permits the host computer to communicate with RTUs despite any variations in the bit protocols of the RTUs. The UPC Board further includes a VME/communications controller 102 responsive to a clocking signal from a clock 104 to control the timing of interface 100 for passing data as well as to control the read or write direction of the interface 100. Interface 100 may be a conventional interface which cycles in response to timing signals provided by VME/communications controller 102 in a manner known to those skilled in the art. The UPC Board preferably further includes an interrupt controller 106 such as an Intel 82C59 processor which is responsive to a plurality of event driven system interrupts from the host processor to provide appropriate control of data communications to/from the RTUs when various error conditions and the like are detected. In a preferred embodiment, 44 interrupts per UPC Board are recognized.

As further illustrated in FIG. 1, a plurality of input/output (I/O) groups 108–114 are connected to the internal bus of the UPC Board. These I/O groups 108–114 provide separate I/O channels for communication with the RTUs via an RS-232 or other known line interface. In a preferred embodiment, each I/O group 108–114 is identical and comprises two receive/transmit channels and two control channels. Access to these I/O groups 108–114 is preferably controlled by separate I/O addresses, bus arbitration and the like provided by VME/communications controller 102.

The circuitry of each I/O group will now be described with further reference to FIG. 1. For ease of description, only I/O group 108 will be described, for, as noted above, I/O groups 110, 112, and 114 are typically identical in design to I/O group 108. As illustrated in FIG. 1, each I/O group includes a buffer 116 which provides a gateway or a pathway to the interface 100 via the UPC Board internal data bus and hence a connection to the VME bus and VME computer backplane. Each I/O group further includes a conventional direct memory access (DMA) circuit 118 for providing addresses to data stored in a conventional memory 120. DMA circuit 118 and memory 120 are connected via a common data bus 122 to respective USARTs 124 and 126 for each receive/transmit line. As will be described in more detail below with respect to FIG. 2, USARTs 124 and 126 are typically identical and are specially designed in accordance with the invention such that they may be dynamically reconfigured to support a plurality of different bit-oriented protocols. Each input/output group further includes a group controller 128 which controls accesses to data bus 122 by arbitrating between DMA transfers and VME communications activity, preferably on a first come-first served basis.

Figure 2:
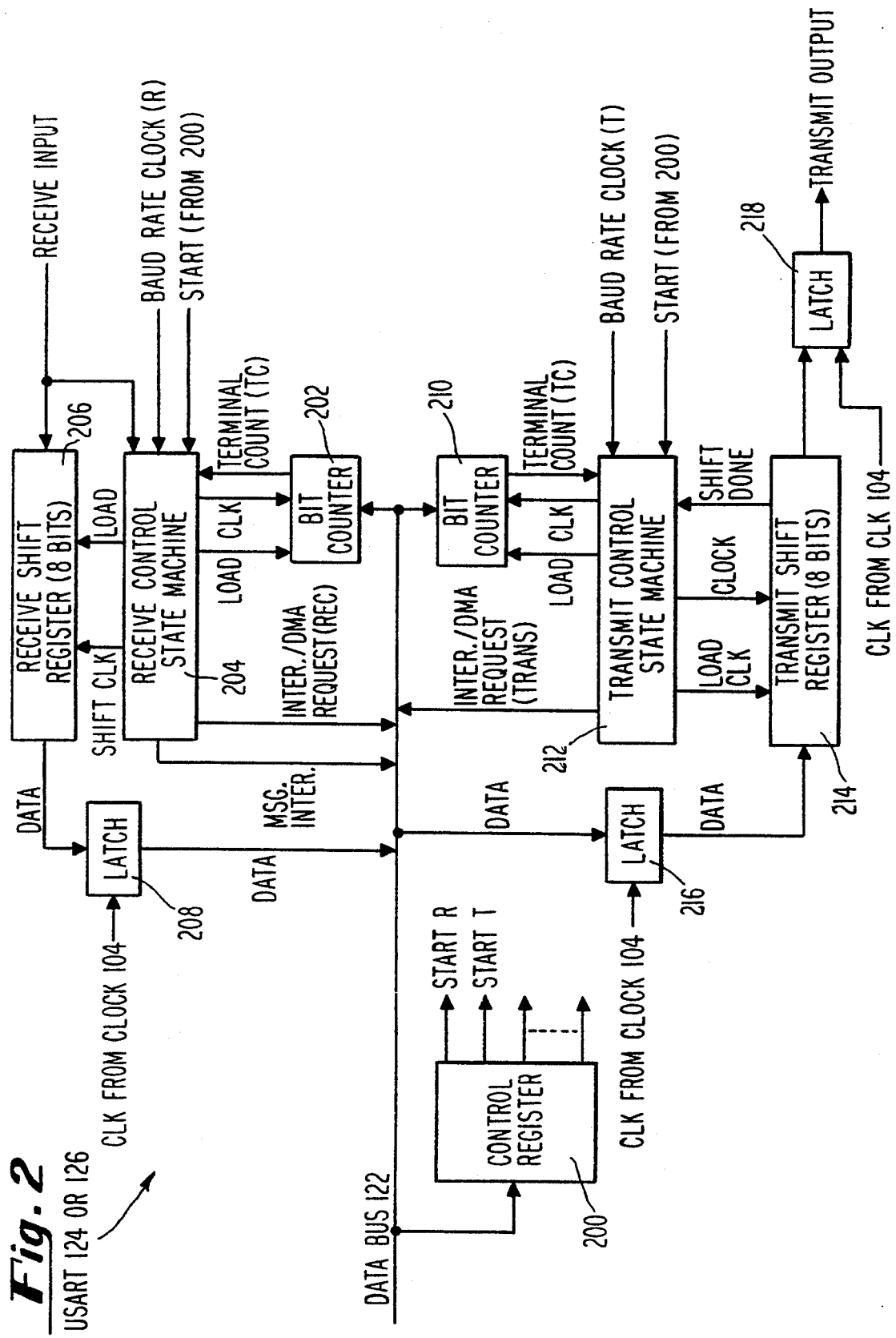
FIG. 2 illustrates a preferred embodiment of a USART disposed within each of the I/O groups of the UPC interface of FIG. 1.

A preferred embodiment of a USART in accordance with the invention is illustrated in FIG. 2. As noted above, USART 124 and 126 are typically identical. Each USART in accordance with the invention preferably includes a control register 200 for detecting flags in an input data stream and for providing receive start and transmit start signals and the like. The receive circuitry of each USART is particularly characterized in accordance with the invention by a bit counter 202 which can be programmed by the user via the interface to the VME bus to count a predetermined number of bits in the received serial input data to control grouping and storage of the input data in memory 120. In other words, as will be described in more detail below with respect to FIG. 3, the programmer may set a terminal count (TC) value in bit counter 202 so that the number of specified bits in the received serial input data is grouped and stored in memory 120 in accordance with the bit protocol of the RTU connected to that particular USART. A receive control state machine 204 responsive to the terminal count TC from bit counter 202, a baud rate clock, a receive start signal from control register 200 and the received serial input data controls the loading and shifting of a fixed bit length (preferably 8-bit) receive shift register 206. Receive control state machine 204 and fixed bit length receive shift register 206 together control the serial to parallel conversion of the received serial input data which is to be placed on the data bus 122 and stored in memory 120. As illustrated in FIG. 2, receive control state machine 204 may also send interrupt requests to group controller 128 and DMA requests to the DMA circuit 118. Message interrupts may also be sent via data bus 122 to VME/communications controller 102. As will be described in more detail below, receive control state machine 204 further controls the loading and clocking of bit counter 202. Finally, as illustrated, the receive circuitry further includes a latch 208 for double buffering the parallel output data from the receive shift register 206 before storing it in memory 120 at an address specified by DMA circuit 118.

The transmit circuitry of each USART is also characterized by a bit counter 210 for counting the bits of an output data stream. As illustrated in FIG. 2, bit counter 210 is programmed via the VME bus with a terminal count TC corresponding to the word bit length of the output protocol of the RTU connected via the line interface to that particular USART. Preferably, the output data is output in the IEEE or ANSI standard format to a line interface which in turn transmits the serial output data to the RTU at the other end of that communications line. As will be described in more detail below with respect to FIG. 4, a transmit control state machine 212 controls the parallel to serial data conversion via a fixed bit length (8-bits in a preferred embodiment) transmit shift register 214 by providing appropriate load and clock signals to transmit shift register 214 and bit counter 210. In a preferred embodiment, the transmit data read from memory 120 is double buffered at latch 216 before being output via transmit shift register 214. The serial output data from transmit shift register 214 is then provided to the line interface via latch 218 and transmitted at the specified baud rate under control of a clock signal from clock 104.

Figure 3A:
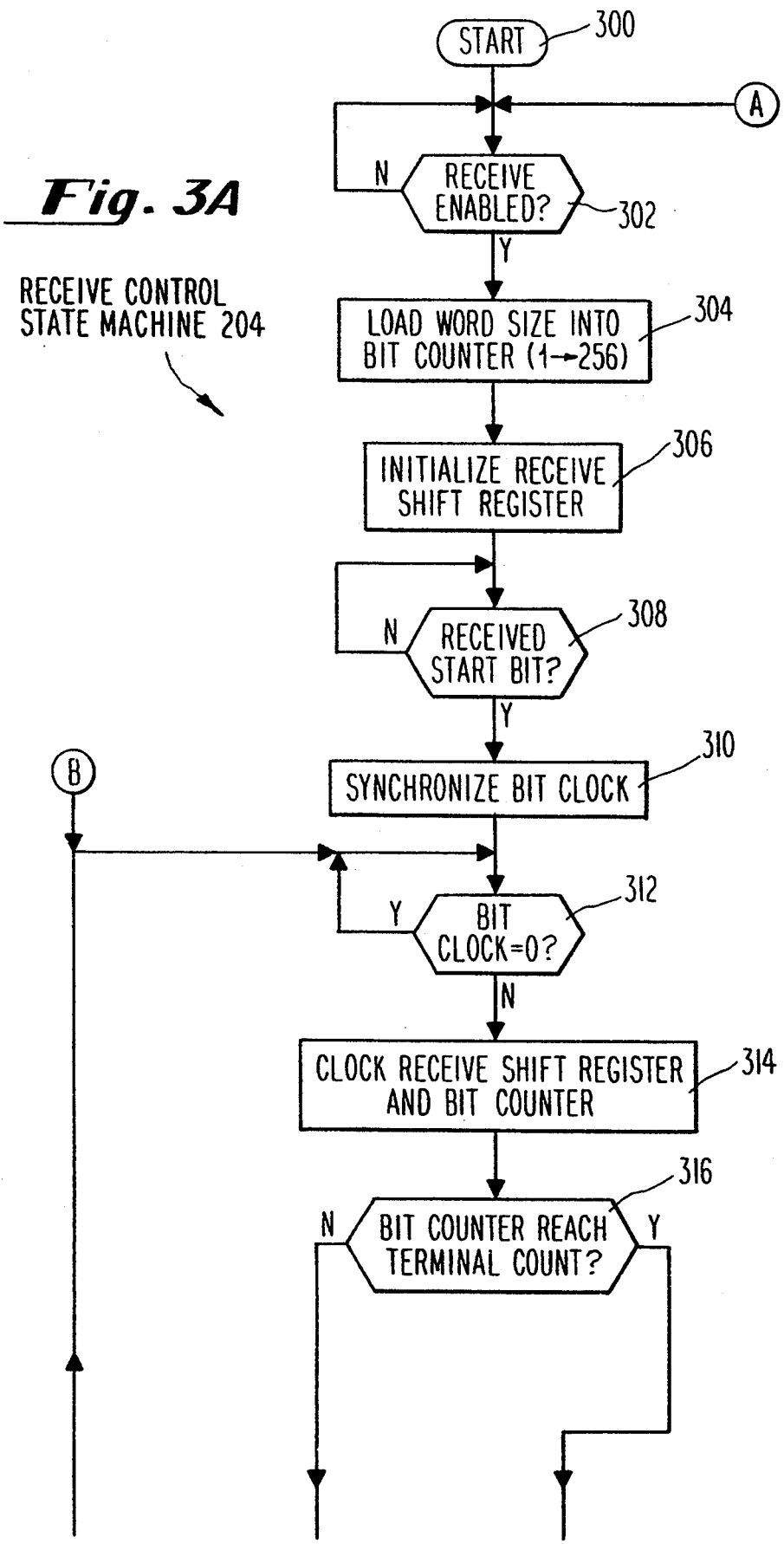
FIG. 3 illustrates a flow diagram of a receive control state machine of the USART illustrated in FIG. 2.
Figure 3B:
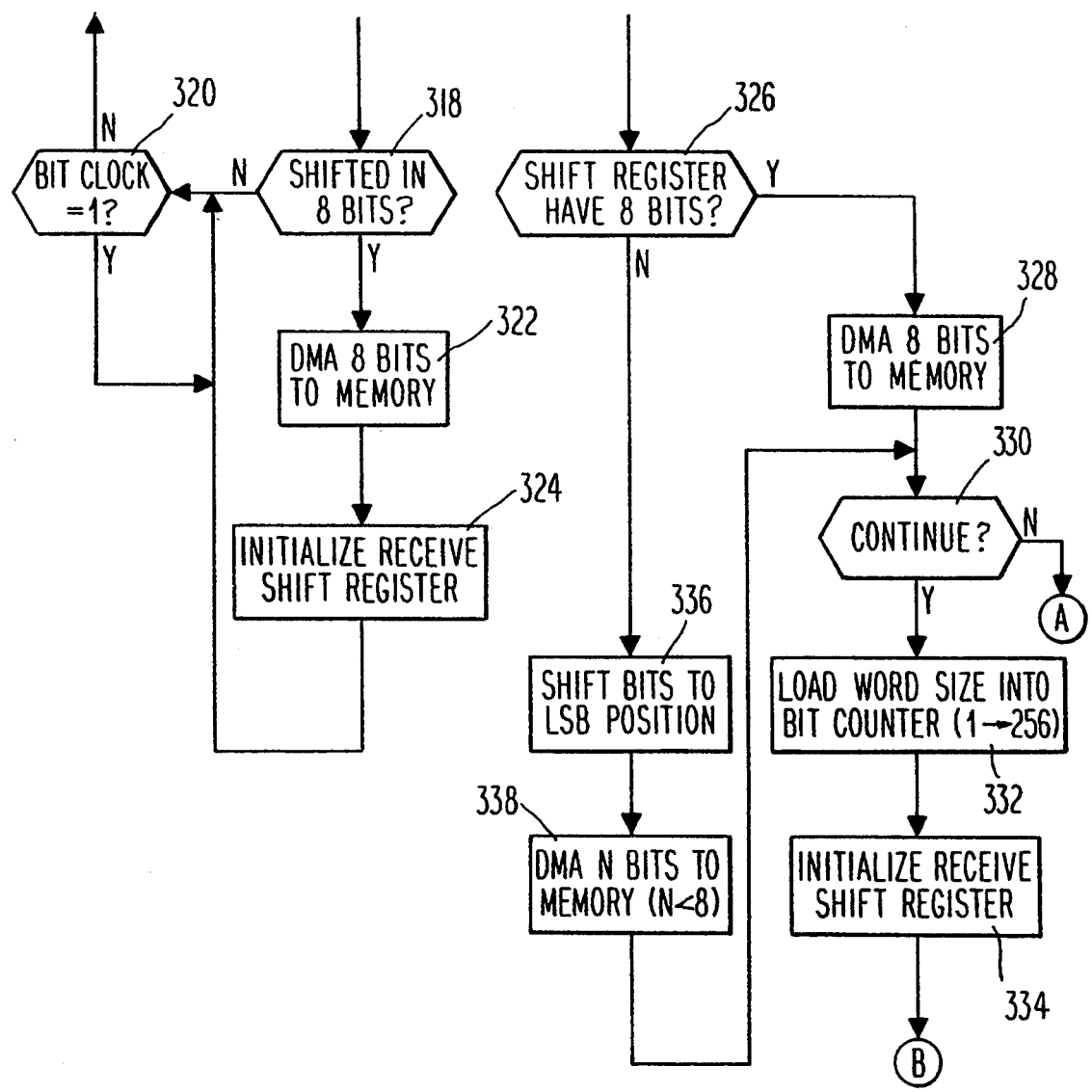

As noted above, receipt of serial input data is controlled by receive control state machine 204. A flow diagram of a preferred embodiment of receive control state machine 204 is illustrated in FIG. 3. As illustrated, receive control state machine 204 starts its processing at step 300. It then determines at step 302 whether a start data receipt signal has been received from control register 200 to enable data reception. When an enable signal has been received, at step 304 the word bit length of the serial data input word (i.e., the bit protocol length of the RTU transmitting to the USART over the current input line) is loaded from a holding register into bit counter 202 as the terminal count to. In a preferred embodiment, this bit length may range from 1 to 256 bits in accordance with the bit protocol of the remote RTU. Of course, greater bit lengths may be readily supported using the techniques of the invention. Receive shift register 206 is then initialized at step 306. Once a start bit in the serial input data is received at step 308, the bit clock 104 is synchronized to the start bit at step 310 for the specified baud rate R. The receive circuitry of the USART is then ready to receive data.

When a rising edge of clock 104 is received at step 312, the serial input data is clocked into receive shift register 206 at step 314 and bit counter 202 is incremented by CLK for each bit received. Receive control state machine 204 then determines at step 316 whether the bit counter 202 has reached terminal count TC. If not, control state machine 204 determines at step 318 whether the receive shift register 206 is full. If the receive shift register 206 is not full, CLK is checked at steps 320 and 312 for the next rising clock edge. The next bit of serial input data is then clocked at step 314 as before. However, if the receive shift register 206 is determined at step 318 to be full, a DMA request is sent over data bus 122 to DMA circuit 118 at step 322 to request that the contents of the receive shift register 206 be transferred to memory 120 via buffer 208 at the address specified by the DMA circuit 118. The receive shift register 206 is then initialized at step 324 and control returned to step 314 for clocking in the next serial input data bit upon receipt of the next rising edge of the clock.

The above process continues until it is determined at step 316 that the terminal count TC has been reached. At this time, it is determined at step 326 whether receive shift register 206 is full. If receive shift register 206 is full, the contents of the receive shift register 206 are transferred at step 328 to memory 120 via latch 208 at the address specified by DMA circuit 118. It is then determined at step 330 whether more data packets of serial input data are being received, and if so, the word bit length of the next data packet is loaded into bit counter 202 at step 332 and the receive shift register 206 initialized at step 334. The serial input data is then clocked in at step 314 on the rising edge of the clock signal as before. This process continues until it is determined at step 330 that no further input data is coming. At that time, processing control returns to step 302.

However, if it is determined at step 326 that receive shift register is not full, it is known that TC (and hence the word bit length of the transmitting RTU) is not a multiple of the bit length of the receive shift register 206. Since memory 120 generally stores data in bytes (eight bits), the data bits remaining in the receive shift register 206 are shifted at step 336 to the least significant bit position of the receive shift register 206 before being transferred to memory 120 at step 338. Steps 336 and 338 help assure that the data stored in memory 120 may be easily reconfigured into a contiguous serial bit stream.

As noted above, transmission of serial output data is controlled by transmit control state machine 212. A flow diagram of a preferred embodiment of transmit control state machine 212 is illustrated in FIG. 4. As illustrated, transmit control state machine 212 starts its processing at step 400. Once transmission is enabled at step 402 by, for example, receipt of a start transmission signal from control register 200, the word bit length of the receiving RTU is then loaded into bit counter 210 at step 404. As with the receive circuitry, the word bit length may be any value between 1 and 256 bits. A DMA request is then sent to DMA circuit 118 and data is read from memory 120 starting at the address specified by the DMA circuit 118. This data is double buffered by latch 216 and then transferred to transmit shift register 214 at step 406. After monitoring the clock at steps 408 and 410 for the next rising clock edge, the data stored in transmit shift register 214 is then shifted out one bit at a time at step 412 at each rising edge of the clock signal from transmit control state machine 212. Bit counter 210 is also incremented at step 412 by CLK for each bit of data shifted out of transmit shift register 214. Transmit control state machine 212 then checks at step 414 whether the terminal count TC has been reached. If not, it is determined at step 416 whether the transmit shift register 214 is empty. If not, the next bit of data is shifted out of transmit shift register 214 at step 412 upon receipt of the next rising clock edge. However, if the transmit shift register 214 is empty, a further DMA request is sent to memory 120 and another byte of data is transferred from memory 120 to transmit shift register 214 via latch 216 at step 418.

The above process continues until TC is reached at step 414. It is then determined at step 420 whether there is further data to be transmitted by checking the contents of latch 216. If it is determined at step 420 that latch 216 is empty, transmission stops and control returns to step 402. However, if there is further data to be transmitted, the word bit length for the next data packet is loaded into the bit counter at step 422 and the next byte of data is transferred from memory 120 into the transmit shift register 214 via latch 216 at step 424 in accordance with the techniques described above. The parallel data provided from memory 120 is thus serialized by transmit shift register 214, output to the line interface via latch 218 and transmitted to the RTU connected to that transmission line.

Those skilled in the art will appreciate that the UPC Board described above contains several highly configurable I/O channels which are readily configurable due to the user's ability to dynamically resize the transmit and receive shift registers for any of the various protocols of the transmitting and receiving RTUs connected to the respective USARTs of the UPC Board of the invention. This technique is in marked contrast to prior art techniques using fixed bit length shift registers to transmit/receive data in a particular predetermined protocol.

To further illustrate the beneficial features of the invention, operation of the UPC Board will be described for the transmission and receipt of 12-bit data words via a standard RS-232 line interface using a USART having 8-bit shift registers configured as herein described.

TRANSMIT EXAMPLE

In transmit mode, a terminal count of 12 is stored in bit counter 210 and the USART configured for transmission of 12-bit data words. DMA circuit 118 is thus instructed to transfer [(INT(12/8+1)*(N 12-bit words)] bytes from memory 120 to the USART connected to the appropriate communications line. The designated USART accepts the bytes transferred from memory 120 and assembles them into the appropriate 12-bit serial data stream as follows.

To transmit ten 12-bit words (where it is assumed that the first bit is a start bit and the last bit can be a stop bit or a data bit), bit counter 210 is first loaded with the value 12. An external baud rate generator is then set to the desired rate (T) and provided to transmit control state machine 212. At a user defined address, memory 120 is then loaded with the transmission data as follows (where bit 0 is typically set to 0 as the start bit of a word):

| address | | | |
|---|---|---|---|
| | NNNN+00 | Word0 | bits 0–7 |
| | NNNN+01 | Word0 | bits 8–11 |
| | NNNN+02 | Word1 | bits 0–7 |
| | NNNN+03 | Word1 | bits 8–11 |
| | NNNN+04 | Word2 | bit 0–7 |
| | NNNN+05 | Word2 | bits 8–11 |
| | + | | |
| | + | | |
| | + | | |
| | + | | |
| | + | | |
| | NNNN+18 | Word9 | bit 0–7 |
| | NNNN+19 | Word9 | bits 8–11 |

DMA circuit 118 is then loaded with the address NNNN+00 identifying the beginning of the data stored in memory 120 which is to be transmitted. A byte count register within DMA circuit 118 is then loaded with a value of 20 to indicate that 10 words are to be transmitted, where 2 bytes are included in each word. Data transfer is then enabled and transfer START signal sent to transmit control state machine 212 from control register 200. Transmission then proceeds in accordance with the flowchart described above with respect to FIG. 4. However, such transfer is also subject to arbitration by group controller 128 for competing VME and DMA requests for data bus 122.

Data is transmitted until bit counter 210 reaches the terminal count TC or the transmit shift register 214 has shifted 8 bits out under control of the transmit control state machine 212. Any excess bits remaining in the transmit shift register 214 are discarded. Transmit control state machine 212 then sends a DMA request to DMA circuit 118 to transmit another byte of data into memory 120. At the appropriate time, this byte (or word fragment) is transferred to latch 216 and to transmit shift register 214 for transmission.

At this point, latch 218 will output a serial stream of data which will appear to have come from a 12-bit USART. However, by changing the terminal count stored in the bit counter 210, the transmit channel can be easily reconfigured to transmit words having any number of bits desired.

RECEIVE EXAMPLE

In receive mode, a terminal count of 12 is stored in bit counter 202 and the USART configured for receipt of 12-bit data words. DMA circuit 118 is thus instructed to transfer [(INT(02/8+1)*(N 12-bit words)] bytes from the appropriate USART to memory 120. Memory 120 accepts the bytes transferred from the USART and stores them in the conventional manner. The process of receiving serial input data proceeds as follows.

To receive ten 12-bit words (where the first bit may be a start bit and the last bit can be a stop bit or a data bit) bit counter 202 is first loaded with the value 12. The baud rate generator is then set to the desired data rate R. DMA circuit 118 is then requested to provide a pointer to the next free location in memory 120. For example, DMA circuit 118 may specify address NNNN for storage of received data. DMA circuit 118 also has its byte count register loaded with the value of 20 to indicate that 10 words of 2 bytes each are to be stored in memory 120. DMA circuit 118 is then enabled and a receive START signal provided to receive control state machine 204 from control register 200. Data reception may then begin.

Data is then received by receive shift register 206 on a serial basis until bit counter 202 reaches the terminal count TC or the receive shift register 206 is full. The receive control state machine 204 then requests the transfer of a byte of data to latch 208 and from latch 208 into the next memory location in memory 120. The USART then receives the next word or word fragment of input data and continues receiving data in accordance with the flow diagram of FIG. 3 until the byte count in DMA circuit 118 is reached. At that time, memory 120 will have received data in the following form:

| address | NNNN+00 | word0 | bits 0-7 |
|---|---|---|---|
| | NNNN+01 | word0 | bits 8-11 |
| | NNNN+02 | word1 | bits 0-7 |
| | NNNN+03 | word1 | bits 8-11 |
| | NNNN+04 | Word2 | bits 0-7 |
| | NNNN+05 | word2 | bits 8-11 |
| | + | | |
| | + | | |
| | + | | |
| | + | | |
| | + | | |
| | NNNN+18 | word9 | bits 0-7 |
| | NNNN+19 | word9 | bits 8-11 |

To the user and the transmitting RTU, the receiving USART functions like a 12-bit device even though it may have a receive shift register of only 8 bits. However, as noted above, the USART of the invention may be reconfigured to allow reception of input data words having bit lengths from 1 to 256 bits in accordance with the techniques herein described.

Although an exemplary embodiment of the invention has been described in detail above, those skilled in the art will readily appreciate that many additional modifications are possible in the exemplary embodiment without materially departing from the novel teachings and advantages of the invention. For example, the transmit and receive shift registers may have fixed bit lengths of 16 bits, 32 bits, and the like. In addition, the line interfaces may be in the ISDN format and the data packets formulated in the appropriate protocol. Accordingly, all such modifications are intended to be included within the scope of this invention as defined in the following claims.

I claim:

1. A universal protocol communications interface controlled by a host processor so as to provide serial synchronous and asynchronous data communication over a plurality of data communications channels between data communications devices having the same or different bit oriented data communications protocol as said host processor, comprising:
    a host interface for selectively providing read and write access to said host processor; and
    a data communications controller comprising:
        a data buffer connected to said host processor via said host interface;
        a memory for storing data for passage to/from said data communications devices;
        a DMA device for providing addresses to data stored in said memory;
        a data bus for providing data communication among said buffer, said memory and said DMA device;
        a controller for arbitrating among different requests for access to said data bus; and
        at least one programmable synchronous/asynchronous receiver/transmitter connected to said data bus so as to provide data communications between said data bus and a plurality of data communications devices over said plurality of data communications channels, each programmable synchronous/asynchronous receiver/transmitter having a programmable bit protocol length for data packets transmitted or received thereby, said bit protocol length being programmed independently for each of said plurality of data communications channels so as to provide serial data communications over each data communications channel in data packets having the bit protocol length of the data communications device connected thereto.

2. A circuit as in claim 1, comprising a plurality of said data communications controllers, wherein each data communications controller comprises one of said programmable synchronous/asynchronous receiver/transmitters for each of said data communications channels.

3. A circuit as in claim 2, wherein each programmable synchronous/asynchronous receiver/transmitter comprises a receiving dynamically variable bit length shift register for shifting onto said data bus from a data communications channel serial input data in data packets having a known bit protocol length and a transmitting dynamically variable bit length shift register for shifting from said data bus into said data communications channel serial output data in data packets having said known bit protocol length.

4. A circuit as in claim 3, wherein each programmable synchronous/asynchronous receiver/transmitter further comprises a receive bit counter which stores said known bit protocol length and counts bits of said serial input data inputted into said receiving dynamically variable bit length shift register and a transmit bit counter which stores said known bit protocol length and counts bits of said serial output data output from said transmitting dynamically variable bit length shift register.

5. A circuit as in claim 4, wherein each programmable synchronous/asynchronous receiver/transmitter further comprises a receive controller for controlling said receiving dynamically variable bit length shift register to shift onto said data bus said serial input data in data packets having said known bit protocol length for storage in said memory, and a transmit controller for controlling said transmitting dynamically variable bit length shift register to shift into said data communications channel said serial output data in data packets having said known bit protocol length.

6. A circuit as in claim 5, wherein said receiving dynamically variable bit length shift register has a physical bit length which does not equal said known bit protocol length and accordingly shifts least significant bits of said serial input data to the least significant bits of said receiving dynamically variable bit length shift register prior to shifting said serial input data onto said data bus.

7. A circuit as in claim 1, wherein said host processor comprises a VME computer backplane connected to said host interface via a VME bus.

8. A circuit as in claim 7, wherein said host interface comprises a controller for controlling the direction of data flow between said VME bus and said data bus through said host interface and for providing system interrupts to said host interface and said data communications controller in response to interrupt requests from said host processor.

9. A circuit as in claim 1, wherein said programmable bit protocol length is variable to accommodate data packets having from 1 to 256 bits.

10. A method of transmitting serial synchronous and asynchronous data from a host computer over a plurality of data communications channels to one or more data communications devices having the same or different bit oriented data communications protocol as said host computer, comprising the steps of:
for each data communications channel, loading a bit protocol length of the data communications device to which that channel is connected;
setting a desired data rate;
starting at a user defined address, loading a memory of said host computer with data to be transmitted as output data to said data communications device;
loading a DMA device with said user defined address and the number of words of data which are to be read from said memory starting at said user defined address;
enabling data transmission;
transferring words of data having a word bit length of said memory to a dynamically variable bit length shift register starting at said user defined address;
shifting data from said dynamically variable bit length shift register into said data communications channel until a number of bits equal to said bit protocol length has been transferred; and
once said number of bits equal to said bit protocol length have been shifted into said communications channel, reloading said dynamically variable bit length shift register with further words of data from said memory.

11. A method of receiving serial synchronous and asynchronous data by a host computer via a plurality of data communications channels, each data communications channel being connected to a data communications device having the same or different bit oriented data communications protocol as said host computer, comprising the steps of:
for each data communications channel, loading a bit protocol length of the data communications device to which that channel is connected;
setting a desired data rate;
determining an address of a memory of said host computer to which input data from said data communications device is to be stored;
loading a DMA device with said memory address and the number of words of input data from said data communications device which are to be written into said memory starting at said memory address;
enabling data receipt;
transferring words of input data having a word bit length of said data communications device to a dynamically variable bit length shift register;
shifting data from said dynamically variable bit length shift register into said memory until a number of bits equal to said bit protocol length has been stored in said memory; and
once said dynamically variable bit length shift register has shifted said number of bits equal to said bit protocol length to said memory, loading said dynamically variable bit length shift register with further words of data having said word bit length from said data communications device.

12. A universal protocol communications interface controlled by a host processor so as to provide serial synchronous and asynchronous data communication over a plurality of data communications channels between data communications devices having the same or different bit oriented data communications protocol as said host processor, comprising:
a host interface for selectively providing read and write access to said host processor; and
a data communications controller comprising:
a data buffer connected to said host processor via said host interface;
a memory for storing data for passage to/from said data communications devices;
a DMA device for providing addresses to data stored in said memory;
a data bus for providing data communication among said buffer, said memory and said DMA device;
a controller for arbitrating among different requests for access to said data bus; and
at least one programmable synchronous/asynchronous receiver/transmitter connected to said data bus so as to provide data communications between said data bus and a plurality of data communications devices over said plurality of data communications channels, each programmable synchronous/asynchronous receiver/transmitter having a programmable bit protocol length which is variable from 1 to 256 bits and programmed independently for each of said plurality of data communications channels so as to provide serial data communications over each data communications channel in the bit protocol length of the data communications device connected thereto.

* * * * *

UNITED STATES PATENT AND TRADEMARK OFFICE
CERTIFICATE OF CORRECTION

PATENT NO. : 5,371,736
DATED : December 6, 1994
INVENTOR(S) : Evan

It is certified that error appears in the above-indentified patent and that said Letters Patent is hereby corrected as shown below:

Column 3, line 51, after "known" delete --data--.

Column 10, line 17, change "[(INT(12/8 + 1)" to --[(INT(12/8) + 1)--.

Column 11, line 12, change "[(INT(02/8 + 1)" to --[(INT((12/8) + 1)--.

Column 11, line 48, change "Word" to --word--.

Signed and Sealed this

Twenty-eight Day of February, 1995

Attest:

BRUCE LEHMAN

*Attesting Officer*  *Commissioner of Patents and Trademarks*